June 22, 1937.  M. A. EDWARDS ET AL  2,084,900
SYSTEM OF ELECTRICAL DISTRIBUTION
Filed Oct. 10, 1935
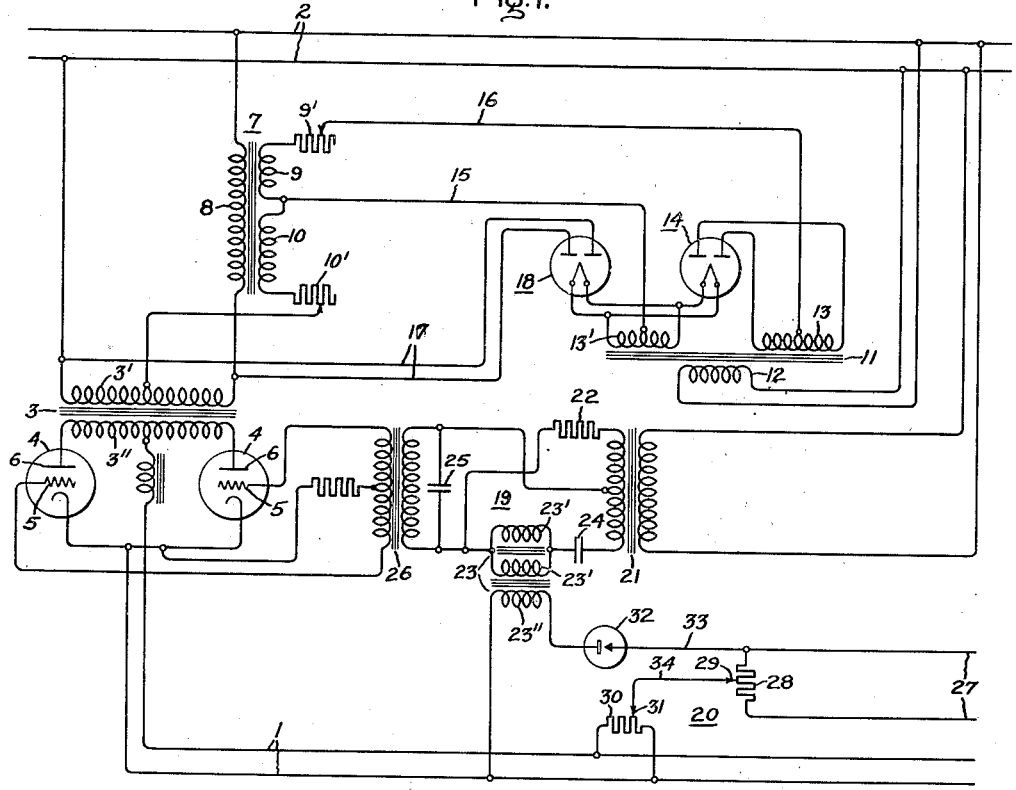
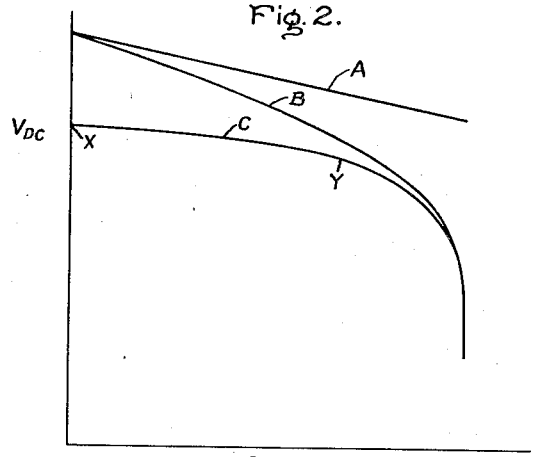
Inventors:
Martin A. Edwards,
Garold A. Kane,
by Harry E. Dunham
Their Attorney.

Patented June 22, 1937

2,084,900

UNITED STATES PATENT OFFICE 2,084,900

SYSTEM OF ELECTRICAL DISTRIBUTION

Martin A. Edwards and Garold A. Kane, Schenectady, N. Y., assignors to General Electric Company, a corporation of New York Application October 10, 1935, Serial No. 44,452

13 Claims. (Cl. 175—363)

Our invention relates to systems of electrical distribution and more particularly to control or regulating systems which automatically control operating characteristics of such systems.

Heretofore, there have been devised numerous arrangements for controlling operating characteristics of distribution circuits. In many of these arrangements, means have been provided for supplying a substantially constant voltage to a load circuit over a predetermined range of power transfer and which have been designed to provide a gradually decreasing voltage to the load circuit when the load exceeds a predetermined value. In numerous systems of this nature, including systems employing electric valves, the voltage reducing and the current limiting features have been obtained by the use of apparatus having a relatively high inductive reactance. However, due to the high inductive reactance, such systems have poor voltage regulation and the maximum power obtainable is relatively low. In transmission and distribution systems employing electric valves, it is desirable to obtain protection against excessive overload currents without sacrificing voltage regulation and the maximum power obtainable from the apparatus used.

It is an object of our invention to provide an improved electrical distribution system.

It is another object of our invention to provide an improved control system for electric distribution systems.

It is a further object of our invention to provide an improved electrical distribution system which makes it possible to control an operating condition within a predetermined range of power transfer and to effect a predetermined departure from said operating characteristic for values of power transfer in excess of said range.

It is a still further object of our invention to provide an improved system of electrical distribution for transmitting energy from an alternating current supply circuit to a direct current load circuit and in which an electrical characteristic of the system may be maintained substantially constant for loads less than a predetermined value and in which the electrical characteristic may be varied in a predetermined manner in response to an increase in load above the predetermined value.

In accordance with the illustrated embodiment of our invention, a load circuit is energized from a supply circuit by means of electric valve apparatus and through a variable impedance device which is utilized to control an electrical characteristic such as the voltage or the current of the load circuit. The variable impedance device may be a saturable reactor having a variable impedance winding interposed between the supply circuit and the load circuit and having a control winding for controlling the magnetization of the reactor in response to the difference of potential between the supply circuit and the voltage appearing across the variable impedance winding. To obtain a means for controlling the conductivity of electric valve apparatus to maintain an electrical characteristic of a load circuit and which may be adapted to co-operate with the variable impedance device to maintain a certain characteristic, we employ an excitation circuit for the electric valve apparatus which is energized from an electric network, such as a voltage divider, in response to a predetermined deviation from the electrical characteristic to be controlled. The excitation circuit for the electric valves may be a suitable phase shifting arrangement, such as that described hereinafter, in which the inductance of an element of the circuit is varied to obtain control of the phase shift between the potentials impressed upon the control members of the electric valves and the associated anodes of the valves.

For a better understanding of our invention, together with other and further objects thereof, reference may be had to the following description taken in connection with the accompanying drawing and its scope will be pointed out in the appended claims.

In the drawing, Fig. 1 illustrates diagrammatically an embodiment of our invention as applied to a distribution system for transmitting energy between an alternating current supply circuit and a direct current load circuit; Fig. 2 represents certain operating characteristics of the apparatus employed in the embodiment of our invention diagrammatically shown in Fig. 1.

Referring now to Fig. 1, the direct current load circuit 1 is energized from the single phase alternating current supply circuit 2 through a transformer 3 and electric valves 4 having control members 5 and anodes 6. The transformer 3 is provided with a primary winding 3' and a secondary winding 3". Interposed between the supply circuit 2 and the primary winding 3' of transformer 3, we employ a variable impedance device, such as a saturable reactor 7, having a variable impedance winding 8 connected in series with the primary winding 3' of transformer 3. This variable impedance device is provided with a winding 9 which impresses upon the magnetic circuit of the device a unidirectional magnetomotive force of substantially constant value. A control winding 10 of the variable impedance device 7 is utilized to control the magnetization of the device 7. Although the windings 9 and 10 may be differentially associated with respect to each other, in the particular arrangement employed, these windings in the embodiment shown in Fig. 1 are connected so that the respective unidirectional magnetomotive forces assist each other. The winding 9 is energized from the alternating current supply source 2 through a transformer 11 having a primary winding 12, a secondary winding 13, and through a full wave rectifying device 14. By this means we provide an arrangement for impressing a substantially constant voltage upon the terminals of winding 9 through conductors 15 and 16, and an adjustable resistance 9'. The control winding 10 is energized from a circuit connected across the primary winding 3' of transformer 3 by means of conductors 17, a full wave unidirectional conducting device such as an electric valve 18, conductor 15, and an adjustable resistance 10'. The secondary winding 13' of transformer 11 is employed to energize the filaments of the full wave unidirectional conducting devices 14 and 18. It will be understood that the unidirectional conducting devices 14 and 18 may be any of the conventional devices known in the art, such as high vacuum electric valves or vapor electric valves. It will be understood that the voltage, and hence the current which the unidirectional conducting device 18 furnishes to the control winding 10, will vary in response to the voltage appearing across the primary winding 3' of transformer 3 and that this voltage will be equal to the difference between the voltage of the supply source 2 and that appearing across the variable impedance winding 8. The variable impedance device 7, which may be a saturable reactor such as that described above, is energized to be substantially saturated within the normal range of power transfer. That is, the magneto-motive forces established by the windings 9 and 10 at no load are sufficient to cause substantial saturation of the device 7. In accordance therewith, the inductive reactance of the variable impedance winding 8 will be relatively small for values of power transfer within this normal range of operation. The winding 10 is provided with a larger number of turns than the winding 9, so that variations in the voltage appearing across the primary winding 3' of transformer 3 will be effective to obtain decided decreases in the magnetization of the reactor 7 and to effect material increases in the impedance of winding 8 as the power transfer exceeds the normal range.

To obtain a means for controlling the conductivity of the electric valves 4, which preferably are of the vapor electric discharge type, we employ an excitation circuit 19 and an electric network 20. The excitation circuit 19 comprises a phase shifting arrangement for controlling the phase relation between the voltages impressed upon the control members 5 and the associated anodes 6 of electric valves 4. This phase shifting arrangement may be of the bridge type in which one of the elements is controlled to obtain an automatic phase shift in response to an electrical condition to be controlled. In particular, we employ a bridge circuit energized from the alternating current supply circuit 2 through a transformer 21. One arm of the bridge circuit comprises a resistance 22; a second arm includes the saturable reactor 23 connected in series with a capacitance 24, and the third arm comprises the secondary winding of transformer 21. The control voltage to be impressed upon the control members is obtained from the mid-point of the secondary winding of transformer 21 and the left-hand terminal of the saturable inductance 23, and is impressed on the primary winding of transformer 26. A capacitance 25 is connected in parallel with the primary winding of transformer 26, and is used to smooth the form of the potential applied by the circuit 19 to the primary winding. The saturable inductance 23 is provided with windings 23' and a winding 23'' which is connected to the electric network 20 and is utilized to vary the magnetization of the saturable inductance 23, and to obtain thereby a phase shift responsive to an electrical condition of the load circuit 1.

The electric network 20, which may be a voltage divider as described hereinafter, is provided to control the energization of winding 23'' in response to variations in the electrical characteristic to be controlled. The electrical condition to be regulated may be either the voltage or the current of the load circuit. More specifically, we provide an auxiliary source of direct current 27 across which is connected a voltage divider 28 having an adjustable tap 29. A voltage divider 30 is connected across the load circuit 1 and is provided with a suitable adjustable tap 31. The circuit through which the winding 23'' of saturable reactor 23 is energized comprises a unidirectional conductive device 32 to permit energization of winding 23' in only one direction, a conductor 33, the upper portion of the voltage divider 28, conductor 34, the left-hand portion of the voltage divider 30, and load circuit 1.

The operation of the embodiment of our invention diagrammatically illustrated in Fig. 1, may be best explained by considering the initial adjustment of certain of the various elements. The magnetization of the variable impedance device 7 and the excitation of electric valves 4 are adjusted initially to supply the desired no-load voltage to the load circuit 1. The energization of the windings 9 and 10 of the variable impedance device may be adjusted, by means of the adjustable resistances 9' and 10', to effect substantial saturation of the device at load and to maintain the device substantially saturated within a predetermined range of operation. Within this range of operation, the impedance of the winding 8 of device 7 will increase slightly, and for values of power transfer in excess of the range the impedance of winding 8 increases more rapidly because of the decreased energization of control winding 10 which is energized in response to voltage appearing across primary winding 3', or in other words, in response to the difference between the voltage of supply circuit 2 and the voltage drop across winding 8.

The effect of the variable energization of the control winding 10 by the electric valve 18 may be readily explained by referring to Fig. 2 of the drawing, in which the curve A represents the variation of the voltage of the load circuit 1 as a function of load current, when the interconnecting apparatus has a substantially constant impedance. In such an arrangement, the output voltage-current characteristic would be a straight line as shown by curve A. By employing a variable impedance apparatus, such as the device 7, the voltage characteristic may be made to decrease more rapidly for certain increases in load current, so that the output voltage-current characteristic takes the form of curve B of Fig. 2. A more desirable output characteristic is represented by curve C of Fig. 2, in that the voltage remains substantially constant for values of load current within a certain range, and for values of power transfer in excess of this range the voltage changes abruptly to obtain a substantially constant-current operating condition.

To obtain an output characteristic closely approaching that illustrated by curve C of Fig. 2, we provide an excitation circuit 19 controlled by the electric network 20, which may be a bridge or voltage divider arrangement of the type described above, and which is responsive to an electrical condition to be regulated such as the voltage of load circuit 1. The conductivity of the vapor electric valves 4 is controlled by means of the phase shifting excitation circuit 19 to control the phase relation between the voltages impressed upon the control members 5 and the voltages impressed on the associated anodes 6. It will be understood by those skilled in the art that the average value of the voltage and hence the current supplied to the direct current load circuit 2 by the electric valves 4 may be varied, as desired, by varying the phase relationship between control member and anode voltages. For example, when the control member and anode voltages are substantially in phase with each other, the output voltage is maximum and when the control member voltages and the anode voltages are substantially 180 degrees out of phase with each other, the current is minimum or zero, while for intermediate phase relationships between the control member and anode voltages the output voltage has corresponding intermediate values.

The values of the elements of the phase shifting circuit 19 are chosen so that at no load the phase displacement between the control members and the associated anodes is somewhat less than 180 degrees lagging. By means of the saturating winding 23" of inductance 23, which is energized in response to the electrical condition of load circuit 1, the phase of the control member voltages is advanced or retarded as the voltage of load circuit 1 decreases or increases. At no load, the adjustable taps 29 and 31 of the voltage dividers 30 and 28, respectively, are set to establish the desired voltage of load circuit 1. By means of the voltage dividers 28 and 30, the magnetization of inductance 23, and hence the phase displacement between the control member voltages and anode voltages, is given an initial setting. The variable inductance 23 is designed to be unsaturated at no load.

Within the normal range of power transfer, corresponding to the portion $x-y$ of curve C in Fig. 2, the decreases in voltage occasioned by increases in load current will be compensated for by an increase in the average conductivity of electric valves 4. This automatic compensation within the normal range is accomplished by control of the saturation and hence control of the impedance of the variable inductance 23. As the load current exceeds the predetermined maximum value, the current flowing through winding 23" will effect substantial saturation of the inductance 23 so that the value of this inductance remains substantially constant. For values of power transfer in excess of this range, it will be apparent that the output voltage will decrease rapidly since there will be no further advance in the phase of the control member voltages to effect compensation for voltage decrease and since the voltage supplied to the anodes of valves 4 is materially reduced by virtue of the increased impedance of the device 7.

From the foregoing description, it will be apparent that we provide an electrical distribution system which furnishes a substantially constant voltage within a predetermined range of operation and which furnishes a substantially constant current relation for values of power transfer in excess of said range. It will be further apparent that our invention may be used as a starting circuit for dynamo-electric machines. Although the particular embodiment described above affords a means for obtaining a drooping voltage characteristic on overload, our invention may be employed to furnish a rising voltage characteristic on overload. One way in which this may be accomplished is by arranging the device 8 so that it is substantially unsaturated within the normal range of operation. By connecting the windings differentially, that is, so that winding 9 tends to saturate device 7 and winding 10 opposes winding 9, the impedance of winding 8 may be made to remain substantially constant within a certain range of operation and to decrease abruptly for power transfer in excess of said range. In this manner, the output voltage may be given a rising characteristic.

While we have shown and described our invention as applied to a particular system and as embodying certain devices diagrammatically shown, it will be obvious to those skilled in the art that changes and modifications may be made without departing from our invention, and we therefore, aim in the appended claims to cover all such changes and modifications as fall within the true spirit and scope of our invention.

What we claim as new and desire to secure by Letters Patent of the United States is:

1. In combination, an alternating current circuit, an alternating current device connected to be energized therefrom, an impedance device connected between said alternating current circuit and said alternating current device and having a unidirectional magnetizing winding and a control winding, and means for controlling the impedance of said impedance device to maintain an electrical characteristic of said alternating current device substantially constant within a predetermined range of power transfer and for effecting a predetermined departure from said characteristic for values of power transfer in excess of said range comprising an electric valve means for energizing said control winding in accordance with a resultant electrical characteristic obtained from an electrical characteristic of said alternating current device and an electrical characteristic of said impedance device.

2. In combination, an alternating current circuit, an alternating current device connected to be energized therefrom, an impedance device connected between said alternating current circuit and said alternating current device and having a unidirectional magnetizing winding and a control winding, and means for controlling the impedance of said impedance device to maintain the voltage impressed on said alternating current device substantially constant within a predetermined range of power transfer and for varying the voltage impressed on said device for values of power transfer in excess of said range comprising an electric valve means for energizing said control winding in accordance with the difference between the voltage across said alternating current device and the voltage across said impedance device.

3. In combination, a supply circuit, a load circuit, a variable impedance device interposed between said supply circuit and said load circuit for controlling an electrical characteristic of said load circuit within a predetermined range of power transfer and for effecting a predetermined departure from said characteristic for values of power transfer in excess of said range comprising a saturable reactor having a unidirectional magnetizing winding and a control winding for controlling the magnetization of said reactor, and means for varying the energization of said control winding in response to the difference of voltage between said supply circuit voltage and the voltage across said variable impedance device.

4. In combination, a supply circuit, a load circuit, a variable impedance means interposed between said supply circuit and said load circuit for controlling an electrical characteristic of said load circuit within a predetermined range of power transfer and for effecting a predetermined departure from said characteristic for values of power transfer in excess of said range comprising a saturable reactor having a variable impedance winding connected in series between said supply circuit and said load circuit, a unidirectional magnetizing winding for impressing on the magnetic circuit of said reactor a magnetomotive force of substantially constant value and a control winding for controlling the magnetization of said reactor, and means comprising an electric valve responsive to the difference of voltage between said supply circuit voltage and the voltage across said variable impedance winding for varying the energization of said control winding.

5. In apparatus for transmitting energy between an alternating current supply circuit and a direct current load circuit comprising an electric valve having a control member, an excitation circuit for said control member comprising a bridge circuit for varying the phase of the voltage impressed upon said control member for controlling a predetermined electrical characteristic of said load circuit, an auxiliary source of direct current, and means comprising an electric network energized from said load circuit and from said auxiliary source of direct current for obtaining an electrical quantity responsive to a predetermined deviation from said characteristic for controlling said bridge circuit.

6. In apparatus for transmitting energy between an alternating current supply circuit and a direct current load circuit comprising an electric valve having a control member, an excitation circuit for said control member comprising a bridge circuit including a saturable inductance for varying the phase of the voltage impressed upon said control member to control a predetermined electrical characteristic of said load circuit, an auxiliary source of direct current, and means comprising an electric network energized from said load circuit and from said auxiliary source of direct current for obtaining an electrical quantity responsive to said characteristic for controlling said inductance.

7. In apparatus for transmitting energy between an alternating current supply circuit and a direct current load circuit comprising an electric valve having a control member, an excitation circuit for said control member comprising a saturable inductance for varying the phase of the voltage impressed upon said control member to control a predetermined electrical characteristic of said load circuit, and means associated with said excitation circuit responsive to a predetermined deviation from said electrical characteristic comprising an electric network including an auxiliary source of direct current, a voltage divider connected across said source, a voltage divider connected across said load circuit and a unidirectional conducting device for controlling said inductance in response to said deviation from said characteristic.

8. In combination, a supply circuit, a load circuit, variable impedance means interposed between said supply circuit and said load circuit for controlling an electrical characteristic of said load circuit, electric valve means having a control member for transmitting energy from said supply circuit to said load circuit, and an excitation circuit for said control member for controlling the conductivity of said electric valve means by controlling the phase of the voltage impressed on said control member to control said electrical characteristic within a predetermined range of power transfer between said supply circuit and said load circuit to compensate for variations in said characteristic occasioned by said variable impedance means.

9. In combination, a supply circuit, a load circuit, a variable impedance means for controlling an electrical characteristic of said load circuit interposed between said supply circuit and said load circuit, electric valve means having a control member connected for transmitting energy from said supply circuit to said load circuit, means responsive to the difference of potential between said supply circuit and the voltage across said variable impedance means for controlling said variable impedance means, and an excitation circuit for said control member comprising a phase shifting arrangement having a saturable inductance to control the conductivity of said electric valve means to maintain said characteristic substantially constant over a predetermined range of power transfer and for effecting a predetermined departure from said characteristic for values of power transfer in excess of said range.

10. In combination, a supply circuit, a load circuit, a variable impedance means interposed between said supply circuit and said load circuit, electric valve means having a control member connected for transmitting energy between said supply circuit and said load circuit, means responsive to the difference between the voltage of said supply circuit and the voltage across said variable impedance means for effecting a relatively small departure from an electrical characteristic of said load circuit within a predetermined range of power transfer and for effecting a material departure from said characteristic for values of power transfer in excess of said range, and an excitation circuit for said control member for controlling the conductivity of said electric valve means to maintain said electrical characteristic substantially constant within said range and for effecting a predetermined departure from said characteristic for values of power transfer in excess of said range.

11. In combination, a supply circuit, a load circuit, a variable impedance means interposed between said supply circuit and said load circuit, electric valve means having a control member connected for transmitting energy between said supply circuit and said load circuit, means responsive to the difference of potential between said supply circuit and the voltage of said variable impedance means for effecting a predetermined departure from an electrical characteristic of said load circuit, and an excitation circuit for said control member comprising a phase shifting arrangement for controlling the conductivity of said electric valve means to control said electrical characteristic to compensate for the departure from said characteristic occasioned by said variable impedance means.

12. In combination, an alternating current circuit, a second alternating current circuit, a variable impedance device interposed between said circuits for controlling an electrical characteristic of said second circuit within a predetermined range of power transfer and for effecting a predetermined departure from said characteristic for values of power transfer in excess of said range comprising a saturable reactor having a unidirectional magnetizing winding and a control winding for controlling the magnetization of said reactor, and electric valve means for controlling the energization of said control winding in accordance with a resultant electrical characteristic of said first mentioned alternating current circuit and an electrical condition of said variable impedance device.

13. In combination, an alternating current circuit, a second alternating current circuit, a variable impedance device interposed between said circuits for maintaining the voltage of said second circuit substantially constant within a predetermined range of power transfer and for effecting a predetermined change in said voltage for values of power transfer in excess of said range comprising a saturable reactor having a unidirectional magnetizing winding energized in accordance with an electrical condition of said supply circuit and having a control winding for controlling the magnetization of said reactor, and electric valve means for controlling the energization of said control winding in accordance with the resultant of the voltage of one of said first mentioned circuits and the voltage appearing across said variable impedance device.

MARTIN A. EDWARDS.
GAROLD A. KANE.

CERTIFICATE OF CORRECTION.

Patent No. 2,084,900.                                          June 22, 1937.

MARTIN A. EDWARDS, ET AL.

It is hereby certified that error appears in the printed specification of the above numbered patent requiring correction as follows: Page 2, second column, line 50, before the word "load" insert no; and that the said Letters Patent should be read with this correction therein that the same may conform to the record of the case in the Patent Office.

Signed and sealed this 31st day August, A. D. 1937.

Leslie Frazer (Seal)                                         Acting Commissioner of Patents.